UNITED STATES PATENT OFFICE.

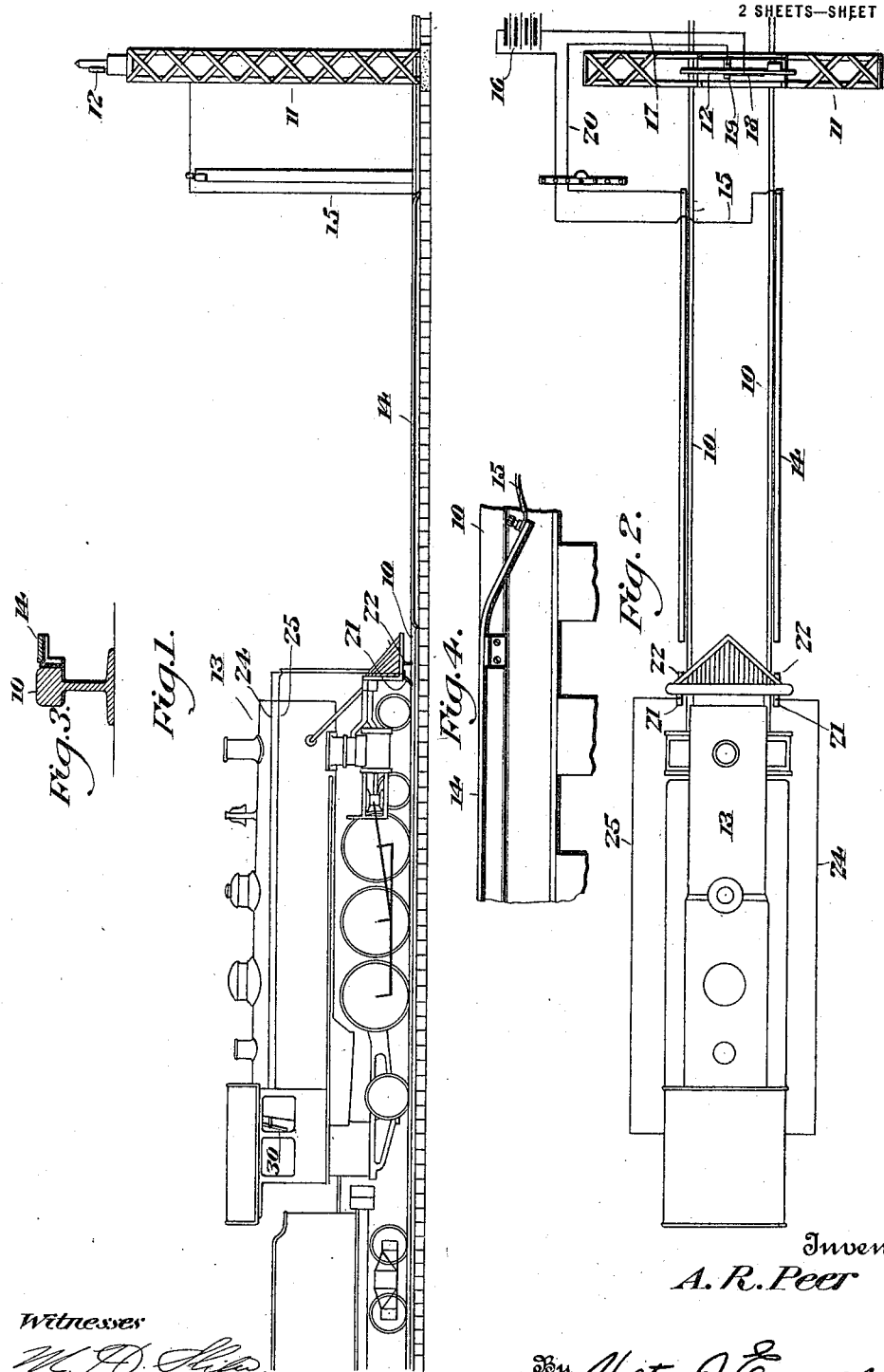

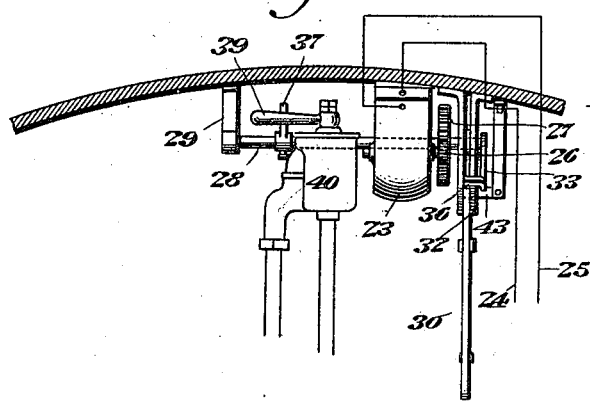
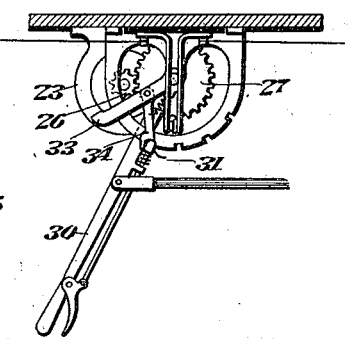
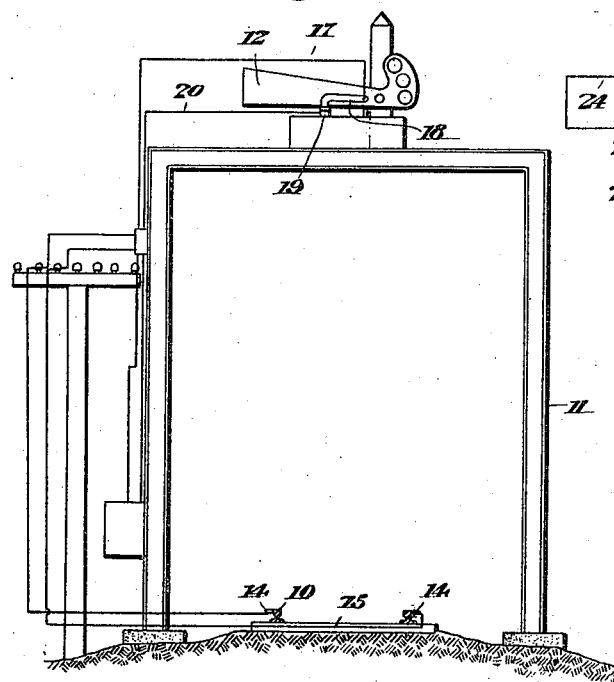
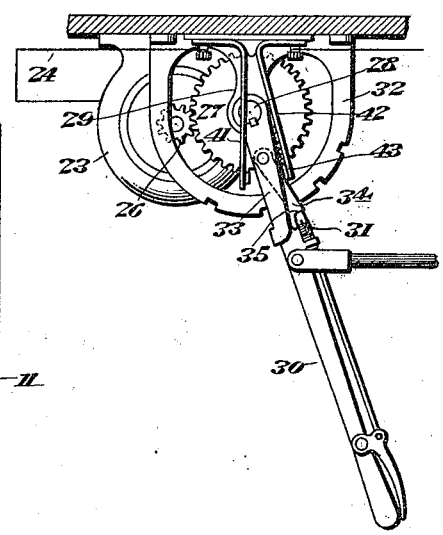

ARTHUR ROSCOE PEER, OF BERKELEY SPRINGS, WEST VIRGINIA.

SAFETY DEVICE FOR LOCOMOTIVES.

1,322,609.  Specification of Letters Patent.  Patented Nov. 25, 1919.

Application filed March 14, 1919. Serial No. 282,574.

*To all whom it may concern:*

Be it known that I, ARTHUR ROSCOE PEER, a citizen of the United States, residing at Berkeley Springs, in the county of Morgan and State of West Virginia, have invented new and useful Improvements in Safety Devices for Locomotives, of which the following is a specification.

This invention relates to train controlling devices and has for an object the provision of means controlled by a semaphore or track signal for closing the throttle valve of an engine and operating the engineer's brake valve to shut off the steam supply and apply the brakes of the train, in the event of the engineer disregarding the danger signal.

To this end the invention contemplates the provision of a train carried motor operated mechanism, which is included in a normally open circuit, in which is also included a switch controlled by the position of the semaphore signal, track contacts and train carried contacts being also included in the circuit, which is closed by the train when the signal is set out danger, whereby the motor will be operated to close the throttle valve and open the air line of the train.

The invention also contemplates the provision of a novel motor operated mechanism, which will unlock or release the throttle lever and engage the latter to close the same, the said mechanism also including means for operating the engineer's brake valve, the throttle lever operating means further operating to interrupt the motor circuit when the lever has reached a closed position.

Other novel features of the invention will appear as the following description is read in connection with the accompanying drawings, in which;

Figure 1 is an elevation showing the general arrangement of the invention.

Fig. 2 is a plan view of the subject matter of Fig. 1.

Fig. 3 is a detail transverse sectional view taken through one of the track rails and through the contact rail carried thereby.

Fig. 4 is a side elevation of Fig. 3.

Fig. 5 is a fragmentary sectional view through the upper portion of the cab of the locomotive and illustrating the mechanism for operating the throttle lever and the engineer's brake valve.

Fig. 6 is an end view of Fig. 5.

Fig. 7 is a view taken transversely of the track showing the signal supporting bridge, the switch controlled by the signal and also showing diagrammatically that portion of the circuit connecting the contact rails and the switch.

Fig. 8 is a view similar to Fig. 6 on a slightly enlarged scale, showing the throttle lever in the position occupied after the operation of the device.

Referring in detail to the drawings, wherein like characters of reference denote corresponding parts, the rails of the track are indicated at 10, the signal bridge or tower at 11, the semaphore or signal arm at 12 and the locomotive at 13.

The device incluudes a track mechanism, the former including a pair of contact rails 14, which are arranged longitudinally upon each side of the track rails and are included in a normally open circuit. This circuit comprises a conductor 15, which connects one of the contact rails 14 with a suitable source of electric energy herein shown as a battery 16. The battery is in turn connected through the medium of a conductor 17, with a movable member 18 of a switch. This member is in the form of a contact mounted upon and movable with the semaphore or signal arm 12, and when the latter is in danger position, the contact is engaged with a stationary contact 19. The contact 19 is connected to the opposite contact rail through the medium of a conductor 20. This portion of the circuit is therefore broken when a clear signal is given and is closed when the signal is set at danger.

The train mechanism includes spring contacts 21, one of which is mounted preferably upon the locomotive pilot at each side thereof in a manner to engage the contact rails, while located in advance of the contacts 21, are brushes or scrapers 22, their purpose being to clean the contact surface of the rails 14, so that proper contact will be made between the said rails and the spring contacts 21. The contacts 21 are connected to the opposite terminals of a motor 23 through the medium of conductors 24 and 25, so that should the semaphore or signal arm 12 be set at danger, the train approaching the signal will have its contacts 21 engage with the contact rails 14, completing the motor circuit and operating the motor.

Secured upon the shaft of the motor is a pinion 26, which engages and operates a gear 27, secured upon a shaft 28, mounted in suitable bearings 29, depending preferably from the roof of the locomotive cab.

A throttle lever by means of which the throttle valve (not shown) of the engine is controlled, is indicated at 30, the said lever being loosely mounted upon the shaft 28 and carrying a spring latch 31, for engagement with suitable notches formed in a segment 32, located adjacent one end of the shaft 28. Rigidly mounted upon the end of the shaft 28, is an arm 33, and pivotally mounted upon this arm is a dog 34, one end of which is provided with a shoulder 35, for engagement with the spring latch 31 of the throttle lever, so that rotation of the shaft 28, through the medium of the motor 23, will cause the dog 34 to release the latch 31 from the segment 32, when the arm 33 is rotated. A further rotation of the arm will cause the laterally disposed extension 36, with which it is provided, to engage the throttle lever 30 and to swing the said lever in a manner to close the throttle valve and cut off the supply of steam, as will be readily apparent.

Rigidly mounted upon the shaft 28, is an arm 37, and when the shaft 28 is rotated, this arm is adapted to contact with a handle 39 of an engineer's brake valve 40, so that simultaneous with the operation of the throttle valve to cut off the steam supply, the brakes will be operated to stop the train.

For the purpose of stopping the operation of the motor 23, after the train has been brought to a standstill, there is included in the conductor 24, a circuit breaker. This circuit breaker is in the form of a pair of spring arms 41 and 42, which when in contact will provide for a continuous flow of current through the conductor 24, but which when separated will interrupt the flow of current and stop the operation of the motor. For this purpose, the contact 42 is provided with a lateral extension 43, located in the path of movement of the arm 33, adapted to be engaged by the said arm after the throttle lever 30 has been moved to a closed position. Through this engagement, the contacts 41 and 42 will be separated and the flow of current interrupted.

It is believed that when the foregoing description is read in connection with the accompanying drawings, the construction, operation and advantages of the invention will be apparent. The invention is susceptible of various changes in its form, proportions and minor details of construction and the right is herein reserved to make such changes as properly fall within the scope of the appended claims.

Having described the invention, what is claimed is:

1. In an automatic train control, the combination with a signal arm, of a normally open circuit, a source of electric supply, a switch included in said circuit and controlled by the signal arm, contact rails also included in said circuit, train carried contacts adapted to engage the contact rails, a motor included in the circuit, means operated by the motor and connected to the throttle lever and engageable with the engineer's brake valve to close the throttle and operate the valve upon completion of the circuit and means actuated by the throttle operated means and including contacting spring arms connected in the motor circuit for interrupting the circuit after the closing of the throttle valve.

2. In an automatic train control, the combination with a signal arm, of a normally open circuit, a source of electric supply, a switch included in said circuit and controlled by the signal arm, contact rails also included in said circuit, train carried contacts adapted to engage the contact rails, a motor included in the circuit, a throttle lever release dog operated by the motor, a throttle actuated arm also operated by the motor and controlling the operation of the release dog for closing the throttle and means for interrupting the circuit after the closing of the throttle valve.

3. In an automatic train control, the combination with a signal arm, of a normally open circuit, a source of electric supply, a switch included in said circuit and controlled by the signal arm, contact rails also included in said circuit, train carried contacts adapted to engage the contact rails, a motor included in the circuit, a throttle lever release dog operated by the motor, a throttle actuated arm also operated by the lever and controlling the release of the dog for closing the throttle and means controlled by the throttle actuated arm for interrupting the circuit after the closing of the throttle valve.

4. In an automatic train control, the combination with a signal arm, of a normally open circuit, a source of electric supply, a switch included in said circuit and controlled by the signal arm, contact rails also included in said circuit, train carried contacts adapted to engage the contact rails, a motor included in the circuit, a throttle lever release dog operated by the motor, a throttle actuated arm also operated by the motor and controlling the operation of the release dog for closing the throttle and a spring contact arm controlled by the throttle actuated arm for interrupting the circuit after the closing of the throttle valve.

In testimony whereof I affix my signature.

ARTHUR ROSCOE PEER.